(12) United States Patent
Daniels et al.

(10) Patent No.: US 10,099,404 B2
(45) Date of Patent: Oct. 16, 2018

(54) PENIS CASTING METHOD AND KIT

(71) Applicants: Rick Daniels, Massapequa, NY (US); Edmund Albert McDowell, Lindenhurst, NY (US)

(72) Inventors: Rick Daniels, Massapequa, NY (US); Edmund Albert McDowell, Lindenhurst, NY (US)

( * ) Notice: Subject to any disclaimer, the term of this patent is extended or adjusted under 35 U.S.C. 154(b) by 864 days.

(21) Appl. No.: 14/542,575

(22) Filed: Nov. 15, 2014

(65) Prior Publication Data

US 2016/0136850 A1  May 19, 2016

(51) Int. Cl.
| | |
|---|---|
| *B29C 39/00* | (2006.01) |
| *B29C 39/02* | (2006.01) |
| *A61H 19/00* | (2006.01) |
| *A61H 23/02* | (2006.01) |
| *B29C 39/10* | (2006.01) |
| *B29K 19/00* | (2006.01) |
| *B29L 31/00* | (2006.01) |
| *B29K 83/00* | (2006.01) |
| *B29C 33/38* | (2006.01) |

(52) U.S. Cl.
CPC .......... *B29C 39/026* (2013.01); *A61H 19/44* (2013.01); *A61H 23/02* (2013.01); *B29C 39/10* (2013.01); *A61H 2201/0153* (2013.01); *B29C 2033/3871* (2013.01); *B29K 2019/00* (2013.01); *B29K 2083/005* (2013.01); *B29L 2031/7532* (2013.01)

(58) Field of Classification Search
CPC .............................................. B29C 2033/3871
USPC ........................................................ 264/222
See application file for complete search history.

(56) References Cited

U.S. PATENT DOCUMENTS

| | | | |
|---|---|---|---|
| 4,335,067 A | | 6/1982 | Castanis et al. |
| 5,275,775 A | * | 1/1994 | Riecken ..................... A61F 5/14 12/142 N |
| 5,718,925 A | * | 2/1998 | Kristinsson ........... A61F 2/5046 264/573 |
| 2005/0285301 A1 | | 12/2005 | Claus et al. |
| 2009/0131744 A1 | * | 5/2009 | Pattenden .............. A61H 19/44 600/38 |
| 2009/0315211 A1 | | 12/2009 | England |

* cited by examiner

*Primary Examiner* — Christina A Johnson
*Assistant Examiner* — Xue H Liu
(74) *Attorney, Agent, or Firm* — Dunlap Bennett & Ludwig PLLC

(57) ABSTRACT

A method of casting a penis using a kit is provided. The present invention includes a cylinder with a first end cap and a second end cap. An opening may be cut through the sidewall of the cylinder. An opening may also be cut through the first end cap. The user may insert their penis through the opening of the first end cap. A liquid molding material may be poured into the opening through the sidewall so that a substantial portion of the cylinder is filled. The liquid molding material hardens over a first period of time forming a solid mold. The penis may be removed from the solid mold. A liquid casting material is poured into the solid mold and hardens over a second period of time forming a casted penis.

9 Claims, 4 Drawing Sheets

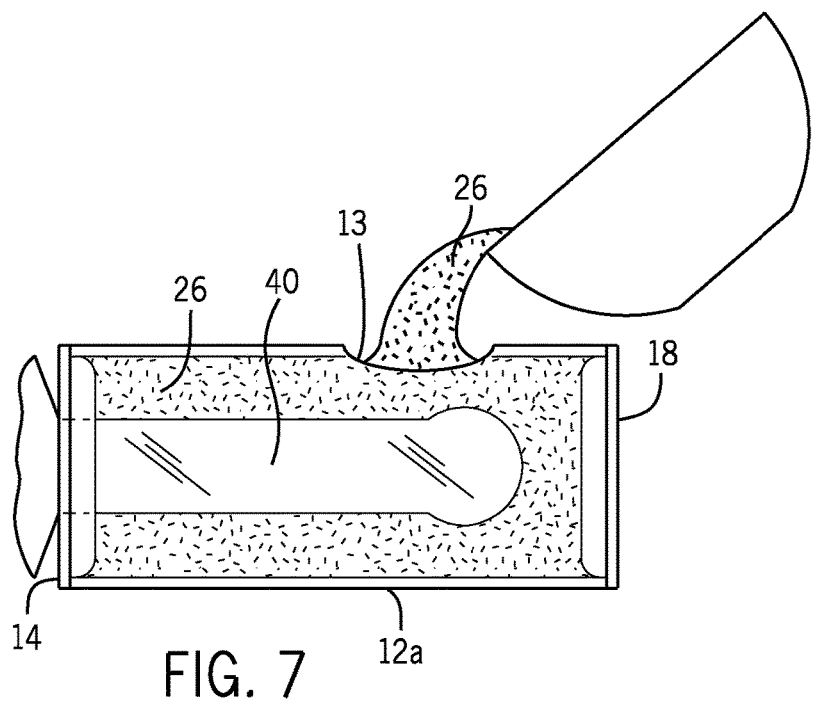
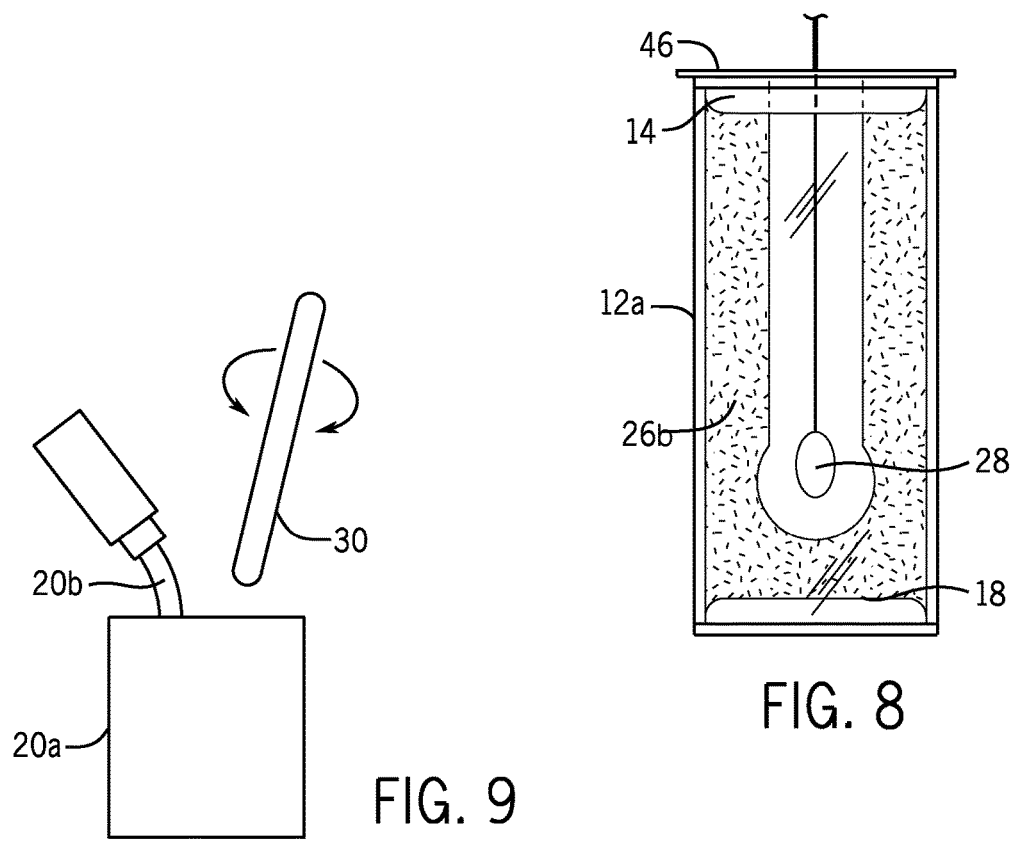

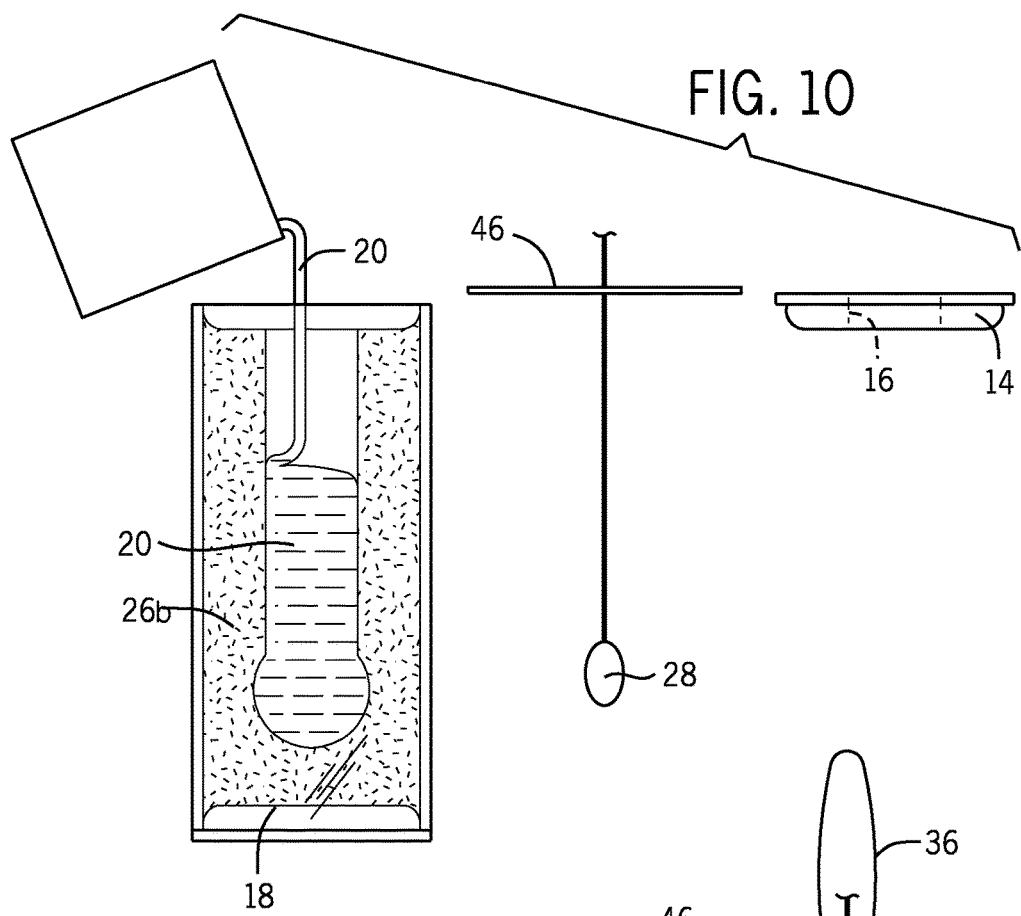
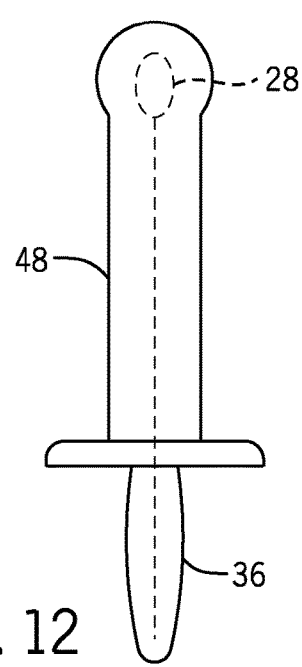
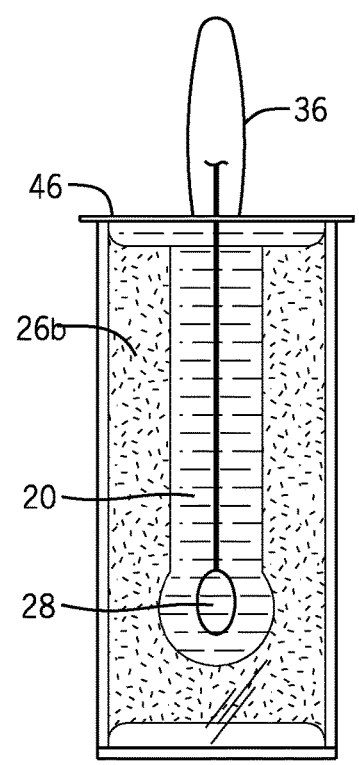
FIG. 10
FIG. 12
FIG. 11

US 10,099,404 B2

PENIS CASTING METHOD AND KIT

BACKGROUND OF THE INVENTION

The present invention relates to medical aid and sexual health enhancement devices and, more particularly, to a personal penis casting method and kit.

Erectile dysfunction (ED) or impotence is sexual dysfunction characterized by the inability to develop or maintain an erection of the penis during sexual activity. A penile erection is the hydraulic effect of blood entering and being retained in sponge-like bodies within the penis. The process is often initiated as a result of sexual arousal, when signals are transmitted from the brain to nerves in the penis. The most important organic causes are cardiovascular disease and diabetes, neurological problems, hormonal insufficiencies and drug side effects.

Further, certain couples may spend extended times apart from one another due to active duty, work obligations, as well as long distance relationships. A sex toy is an object or device that is primarily used to facilitate human sexual pleasure, such as a dildo or vibrator. Many popular sex toys are designed to resemble human genitals and may be vibrating or non-vibrating. However, sex toys are impersonal and provide little remembrance of a distant significant other.

As can be seen, there is a need for a medical aid and sexual health enhancement device in the form of a penis casting method for use by a significant other.

SUMMARY OF THE INVENTION

In one aspect of the present invention, a method of casting a penis comprises: providing a cylinder comprising a sidewall having first end and a second end, wherein a first end cap is secured to the first end and a second end cap is secured to the second end, wherein the first end cap comprises an opening therethrough and the sidewall comprises an opening therethrough; inserting the penis through the opening of the first end cap; pouring a liquid molding material into the opening through the sidewall and filling a substantially portion of the cylinder, wherein the liquid molding material hardens over a first period of time forming a solid mold; removing the penis from the solid mold; and pouring a liquid casting material into the solid mold, wherein the liquid casting material hardens over a second period of time forming a casted penis.

In another aspect of the present invention, a penis casting kit comprises: a cylindrical tube comprising a sidewall forming a housing within and having an open first end and a second end; a first end cap secured to the first end and a second end cap secured to the second end; a molding mixture package within the housing; a casting mixture package within the housing; and a vibrator within the housing, wherein the vibrator comprises a vibrating end, a wire, and a battery end, wherein the wire electrically connects the vibrating end with the battery end.

These and other features, aspects and advantages of the present invention will become better understood with reference to the following drawings, description and claims.

BRIEF DESCRIPTION OF THE DRAWINGS

FIG. 7 is a front elevation view showing the mold material pouring step of the process of the present invention.

FIG. 8 is a front elevation view showing the vibrator location positioning step of the process of the present invention.

FIG. 9 is a front elevation view showing the mixing of the rubber step of the process of the present invention.

FIG. 10 is an exploded front elevation view showing the pouring of the rubber step of the process of the present invention.

FIG. 11 is a front elevation view showing the vibrator insertion step of the process of the present invention.

FIG. 12 is a front elevation view of the finished product of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a method and kit for making a penis replication in silicone rubber with a remote control waterproof bullet vibrator and other external attachments. The present invention may be reproduced in a number of moldable mediums such as silicone rubber, acrylic, soaps, waxes, etc. The battery operated vibrator of the present invention is waterproof and is thereby not susceptible to water damage inherent in similar products. Therefore, the present invention may be cleaned and completely disinfected without fear of water damage to the electrical components.

Figure 1:
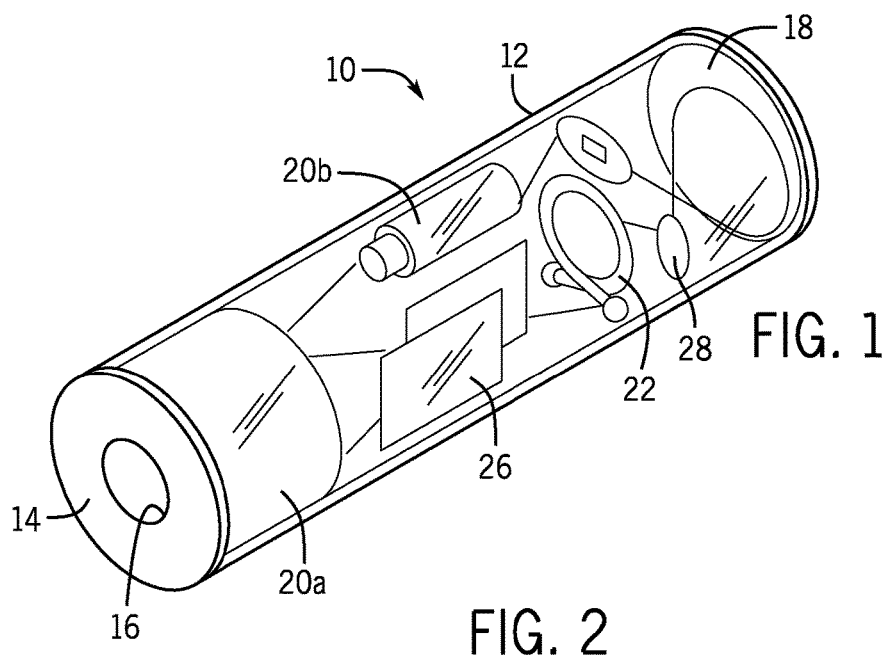
FIG. 1 is a perspective view of the kit of the present invention.
Figure 2:
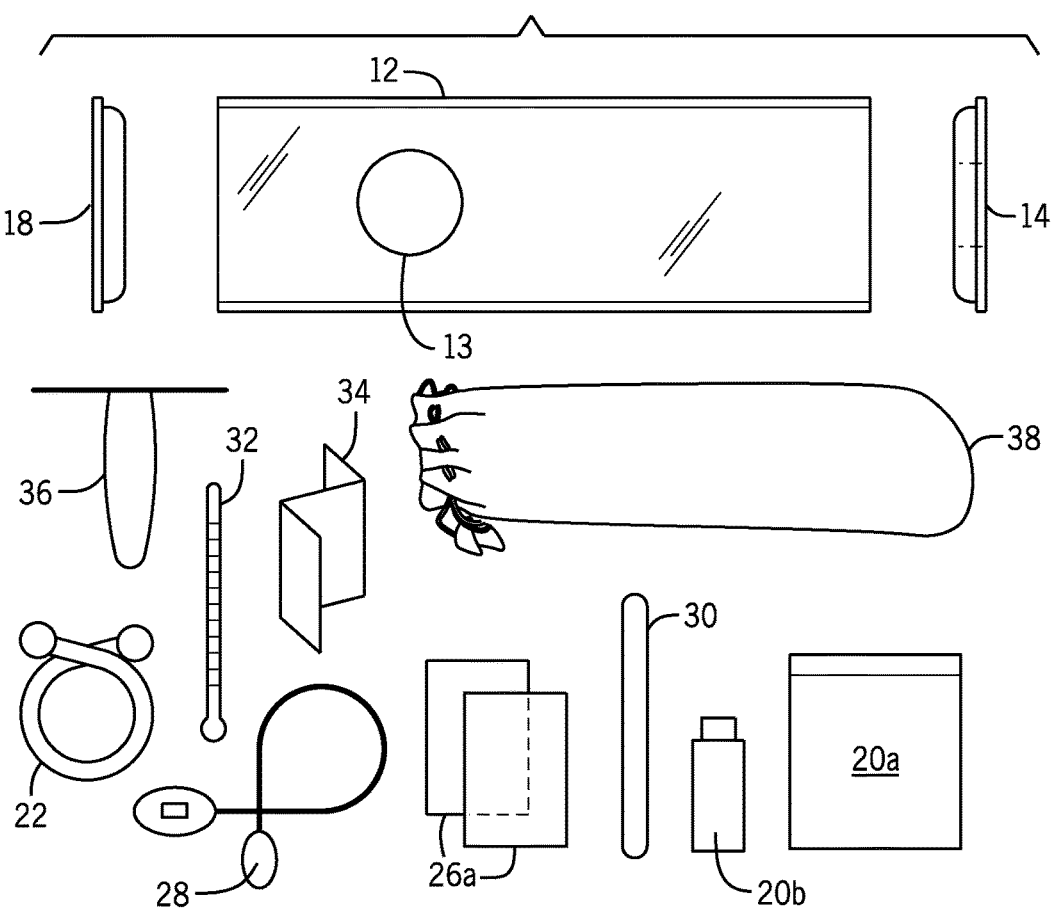
FIG. 2 is an exploded view of the kit of the present invention.
Figure 3:
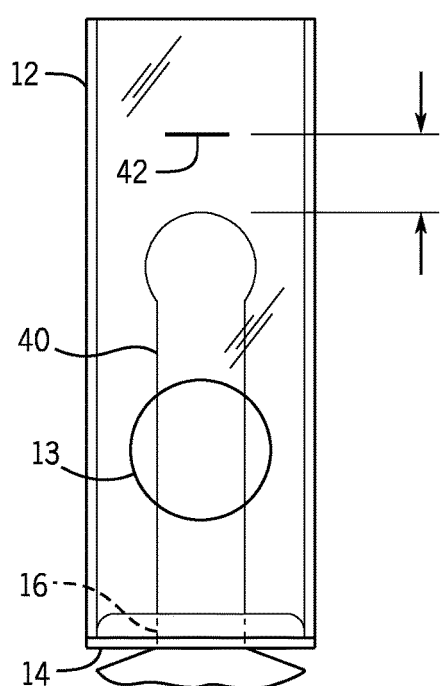
FIG. 3 is a front elevation view showing the measurement step of the process of the present invention.
Figure 4:
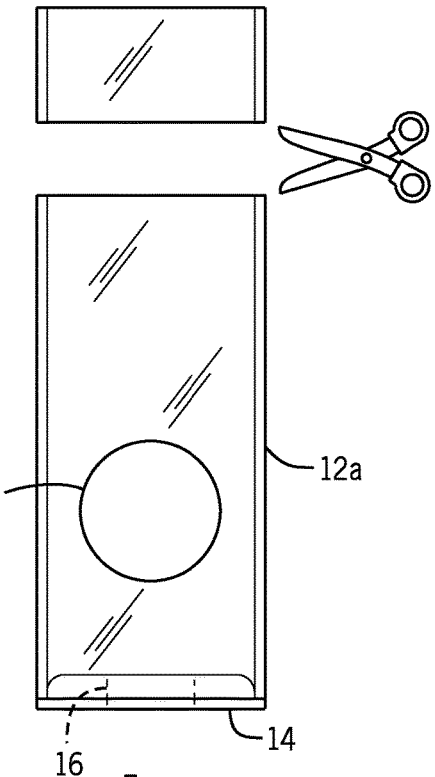
FIG. 4 is a front elevation view showing the cutting to length step of the process of the present invention.
Figure 5:
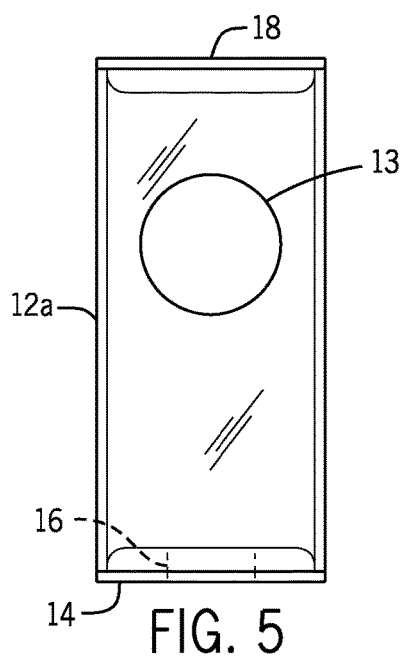
FIG. 5 is a front elevation view showing the end caps placement step of the process of the present invention.
Figure 6:
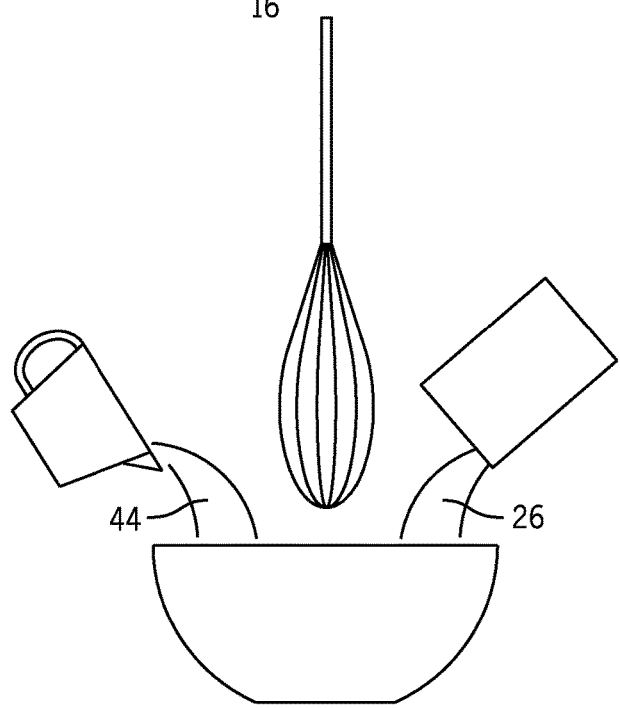
FIG. 6 is a front elevation view showing the mixing step of the process of the present invention.

Referring to FIGS. 1 through 12, the present invention includes a method of casting a penis 40 using a casting kit 10. The casting kit 10 may include a cylindrical tube 12 including a sidewall forming a housing within and having an open first end and an open second end. The present invention further includes a first end cap 14 secured to the first end and a second end cap 18 secured to the second end. The kit 10 may further include a molding mixture package 26a, a casting mixture package 20a, 20b, a vibrator 28, and a compression ring 22. The components listed above may be stored within the housing of the cylinder 12. In alternate embodiments, the kit 10 may further include at least one of a thermometer 32, a stirring rod 30, a handle 36, an instruction manual 34, and a carrying case 38.

A method of casting a penis 40 using the kit 10 may include the following. An opening 13 may be cut through the sidewall of the cylinder 12. An opening 16 may also be cut through the first end cap 14. The user may insert their penis 40 through the opening 16 of the first end cap 14. A liquid molding material 26 may be poured into the opening 13 through the sidewall so that a substantial portion of the cylinder 12 is filled. The liquid molding material 26 hardens over a first period of time forming a solid mold 26b. The penis 40 may be removed from the solid mold 26b. A liquid casting material 20 is poured into the solid mold 26b and hardens over a second period of time forming a casted penis 48.

The cylinder 12 of the kit 10 may come in an extended length so that any sized penis 40 may be casted. Therefore, the cylinder 12 length may be adjusted to accommodate the user's penis 40 length. In such embodiments, the first cap 14 may be placed on the second side. A user may then insert their penis 40 through the opening 16 of the first cap 14. The user may then place a marking 42 on the outer surface of the sidewall about one inch passed the top of the penis 40. The user may view the penis 40, since the cylinder 12 may be made of see through material. Once the marking 42 is made, the penis 40 may be removed. The user may cut the cylinder 12 along a straight line of the marking 42 forming a cut end at the second end and a smaller cylinder 12a. The user may then remove the first cap 14 and place the first cap 14 over the cut end. The user may then place the second cap 16 over the opposite end. Further, if the penis 40 is substantially curved, the cylinder 12 may be altered by cutting portions at taping the portions back together in an angled position.

The liquid molding material 26 may then be prepared. Using the thermometer 30, water 44 may be prepared at 90 F. The molding mixture 26a, such as a powder, may be mixed with three cups of the 90 F water 44. Once mixed together, the user may insert their penis 40 into the cylinder 10 through the opening 16 of the first cap 14. The penis 40 may maintain their erection by using the compression ring 22. The user may then pour the liquid molding material 26 through the opening 13 of the sidewall so that the liquid molding material 26 completely covers the penis 40. The user may wait around 2-5 minutes for the liquid molding material 26 to dry to the solid mold 26b. The user may remove their penis 40 and the solid mold 26b is ready to use.

The placement of the vibrator 28 within the casted penis 48 may be determined. The user may first place the vibrating end into the solid mold 26b until the vibrating end hits the tip. The user may then pull the wire up about one inch, so that the vibrating end is suspended once inch from the end of the mold 26b. A user may then mark an area on the wire that is aligned with the first end. The vibrator 28 is then removed from the mold 26b. A card board sheet 46 may be placed over the mold 26b and punctured at the center of the mold 26b. The vibrator 28 may run through the punctured card board sheet 26 so that the mark is aligned with the card board sheet 26.

The liquid casting material 20 may then be prepared. The liquid casting material 20 may come as two parts, a liquid or powder 20a and a hardener 20b. The liquid or powder 20a and hardener 20b are mixed together using the mixing rod 30 forming the liquid casting material 20. The liquid casting material 20 may be a rubber silicone or other material mentioned above. The first cap 14 is removed from the cylinder 12 and the liquid casting material 20 is poured into the cast 26b. The vibrating end of the vibrator 28 may be placed in the liquid casting material 20 and the card board sheet 26 may rest on the first end, thereby ensuring the correct placement of the vibrating end. In certain embodiments, a handle 36, suction cup, strap on components, or the like may also be partially inserted into the first end. In such embodiments, a portion of the cast 26b may be cut away prior to filling the cast 26b with the liquid casting material 20 to accommodate for the added accessories.

The vibrator 28 of the present invention may include a vibrating end, an elongated wire, and a battery end. The wire may electrically connect the vibrating end to the battery end. The elongated wire is used so that the vibrating end may be suspended near the tip of the casted penis 48, while the battery may be substantially outside of the casted penis 48. The battery end may also include the controls, such as an on and off button or a level of vibration control. The batter end also includes a battery housing so that the battery may be easily inserted and removed.

After the liquid casting material 20 is poured into the cast 26b, the kit 10 may sit from about 15 to about 25 hours so that the liquid casting material 20 may harden into the casted penis 48. Once hardened, the user may remove the cast 26b from the cylinder 12. The cast 26b may then be broken away and the finished casted penis 48 is revealed. The carrying case 38 may be used to secure the casted penis 48 when not in use.

It should be understood, of course, that the foregoing relates to exemplary embodiments of the invention and that modifications may be made without departing from the spirit and scope of the invention as set forth in the following claims.

What is claimed is:

1. A method of casting a penis comprising:
providing a cylinder comprising a sidewall having first end and a second end, wherein a first end cap is secured to the first end and a second end cap is secured to the second end, wherein the first end cap comprises an opening therethrough and the sidewall comprises an opening therethrough;
inserting the penis through the opening of the first end cap so that the opening of the sidewall is disposed above the penis;
pouring a liquid molding material into the opening through the sidewall and filling a substantially portion of the cylinder, wherein the liquid molding material hardens over a first period of time forming a solid mold;
removing the penis from the solid mold; and
pouring a liquid casting material into the solid mold, wherein the liquid casting material hardens over a second period of time forming a casted penis.

2. The method of claim 1, further comprising the steps of:
removing the solid mold from the cylinder; and
breaking the solid mold off of the casted penis, after the liquid casting material hardens.

3. The method of claim 1, further comprising the step of:
providing a vibrator comprising a vibrating end, a wire, and a battery end, wherein the wire electrically connects the vibrating end with the battery end; and
placing the vibrating end within the liquid casting material after the liquid casting material has been poured into the solid mold and before the liquid casting material hardens, wherein the vibrating end is within the liquid casting material and the battery end is outside of the liquid casting material.

4. The method of claim 3, wherein the battery end comprises an on and off switch, and a battery compartment.

5. The method of claim 1, further comprising the step of sizing the cylinder prior to pouring the liquid molding material into the opening through the sidewall, wherein sizing the cylinder comprises the steps of:
inserting the penis through the opening of the first end cap;
marking an outer surface of the sidewall about one inch passed the tip of the penis, forming a marking;
removing the penis from cylinder;
cutting the cylinder along a straight line of the marking forming a cut end of the cylinder; and placing the second end cap over the cut end of the cylinder.

6. The method of claim 1, wherein the first period of time is about 2 to about 5 minutes, and the second period of time is about 15 to about 25 hours.

7. The method of claim 1, wherein the liquid casting material is a liquid silicone rubber.

8. The method of claim 1, further comprising the step of at least partially inserting a handle into the liquid casting material after the liquid casting material has been poured into the solid mold and before the liquid casting material hardens.

9. A method of casting a penis comprising:
providing a cylinder comprising a sidewall having first end and a second end, wherein a first end cap is secured to the first end and a second end cap is secured to the second end, wherein the first end cap comprises an opening therethrough and the sidewall comprises an opening therethrough;
inserting the penis through the opening of the first end cap;
marking an outer surface of the sidewall about one inch passed the tip of the penis, forming a marking;
removing the penis from cylinder;
cutting the cylinder along a straight line of the marking forming a cut end of the cylinder;
placing the second end cap over the cut end of the cylinder.
inserting the penis through the opening of the first end cap for a second time;
pouring a liquid molding material into the opening through the sidewall and filling a substantially portion of the cylinder, wherein the liquid molding material hardens over a first period of time forming a solid mold;
removing the penis from the solid mold; and
pouring a liquid casting material into the solid mold, wherein the liquid casting material hardens over a second period of time forming a casted penis.

\* \* \* \* \*